March 26, 1968  C. F. VAN PRAAG  3,374,721

PANORAMIC CAMERA

Filed April 26, 1965  3 Sheets-Sheet 1

INVENTOR.
CLIFFORD F. VAN PRAAG
BY
ATTORNEY

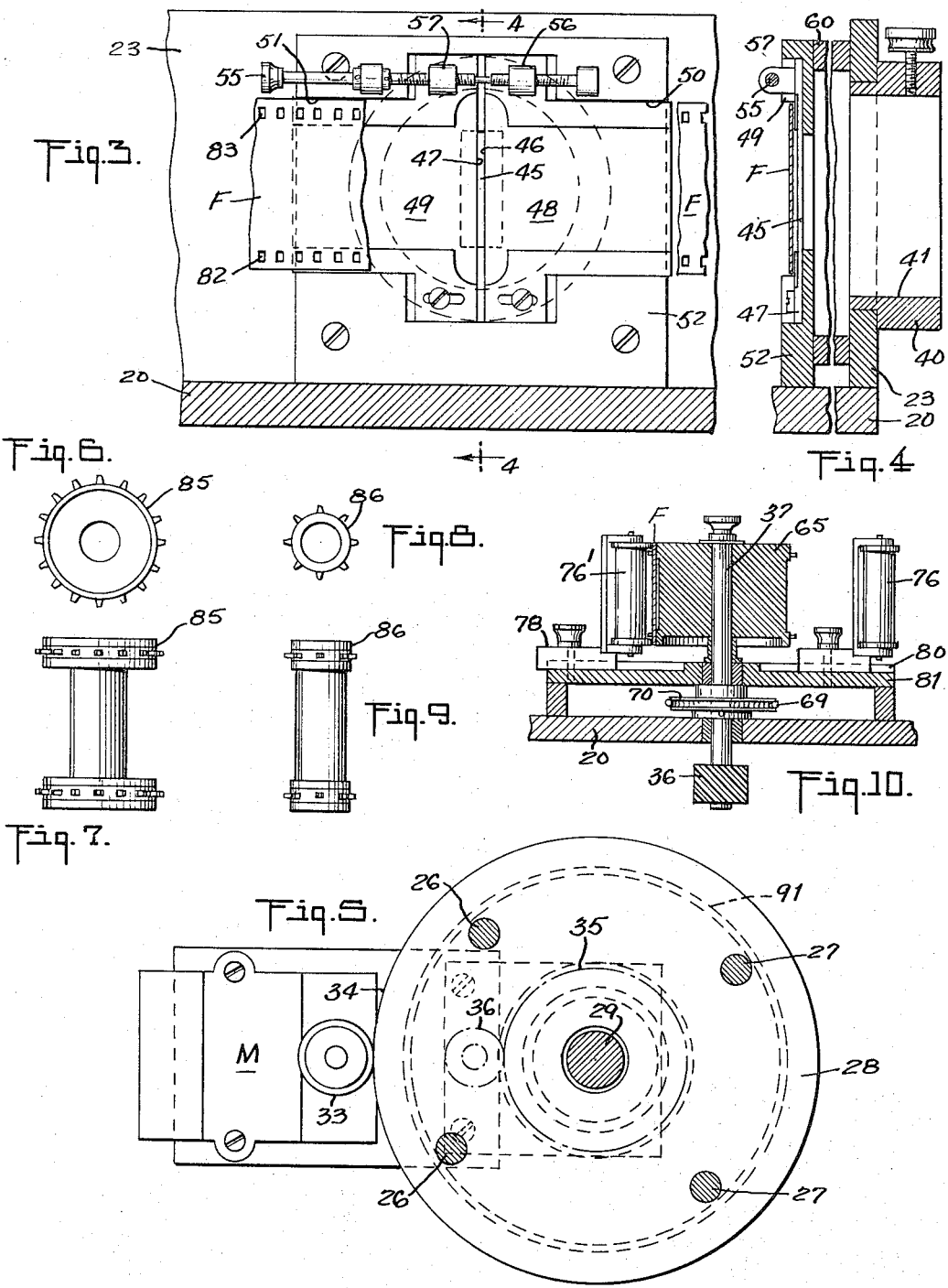

March 26, 1968  C. F. VAN PRAAG  3,374,721
PANORAMIC CAMERA
Filed April 26, 1965  3 Sheets-Sheet 3
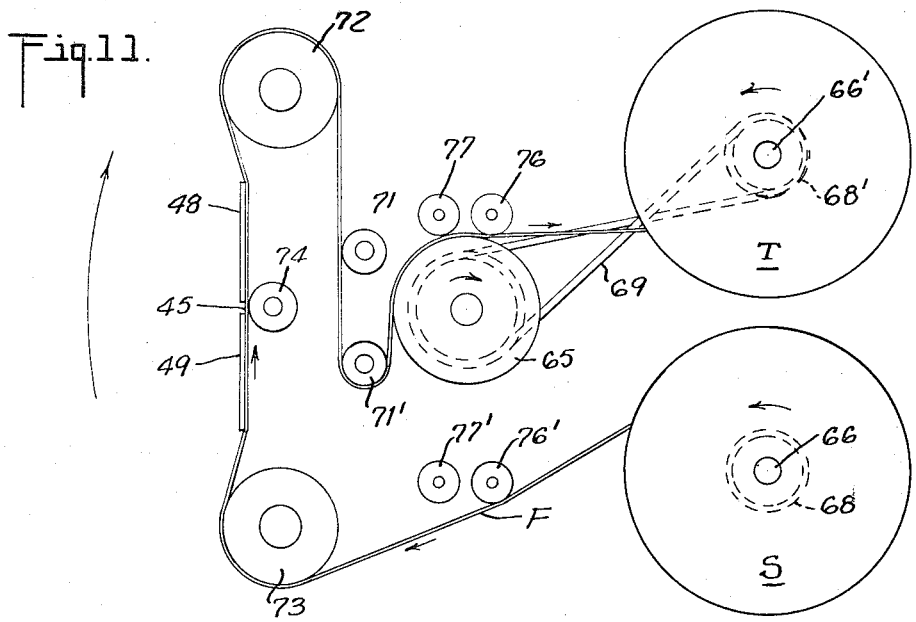
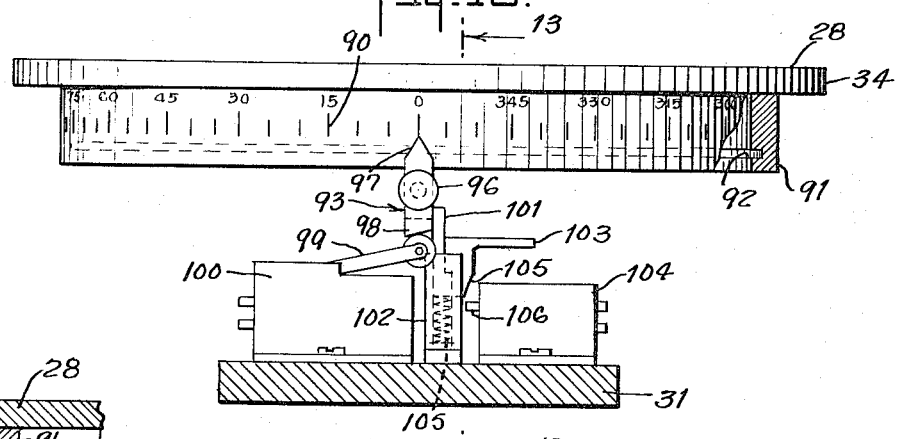
INVENTOR.
CLIFFORD F. VAN PRAAG
BY
Luther W Hawley
ATTORNEY

United States Patent Office 3,374,721
Patented Mar. 26, 1968

3,374,721
PANORAMIC CAMERA
Clifford F. Van Praag, Oceanside, N.Y., assignor to A.V.E. Corporation, New York, N.Y., a corporation of New York
Filed Apr. 26, 1965, Ser. No. 450,621
3 Claims. (Cl. 95—15)

ABSTRACT OF THE DISCLOSURE

A panoramic camera is provided which is adapted to be rotated through a desired arcuate distance, the camera having its film set in synchronization with the camera rotational speed. An adjustable exposure slot is also provided and means are provided for discontinuing the rotation of the camera at any of an infinite number of camera positions as determined by the angular rotation of the camera housing.

---

This invention relates to a panoramic camera.

More particularly stated, the invention relates to a camera of the type specified so mounted that the camera can take an exposure through 360° or any fraction thereof.

The invention has for its salient object to provide a panoramic camera that is simple in construction and operation and will operate smoothly and efficiently to accomplish its object.

Another object of the invention is to provide a panoramic camera so constructed that it can be operated to feed the film during the rotation of the camera so as to accommodate different focal length lenses and film widths such as 8 mm., 16 mm., 35 mm., and so forth.

Another object of the invention is to provide a panoramic camera so constructed that it can be quickly adjusted by changing film drive sprockets to accommodate lenses of different speeds.

Another object of the invention is to provide a panoramic camera so constructed and arranged that the synchronized movement or feed of the film can be varied when used with a zoom lens to accommodate an effective focal length of the zoom lens and to accommodate the shortest and longest focal length.

Another object of the invention is to provide a panoramic camera having an exposure slot in front of the film so constructed and arranged that the width of the slot can be adjusted.

Further objects of the invention will be clear from the following specification taken in connection with the drawings which form a part of this application and in which:

FIG. 3 is a detailed elevational view taken substantially on line 3—3 of FIG. 1 looking in the direction of the arrows.

FIG. 4 is a vertical sectional elevation taken substantially on line 4—4 of FIG. 3 looking in the direction of the arrows.

FIG. 5 is a plan view of the driving connections for the camera taken substantially on line 5—5 of FIG. 2 looking in the direction of the arrows.

FIG. 6 is a top plan view of one of the film driving sprockets utilized to feed the film across the exposure slot and to the film take-up spool.

FIG. 7 is a side elevation of the sprocket shown in FIG. 6.

FIGS. 8 and 9 are top plan and side elevational views similar to FIGS. 6 and 7 but showing a different size of film driving sprocket.

FIG. 10 is a sectional elevation taken substantially on line 10—10 of FIG. 1 looking in the direction of the arrows.

FIG. 11 is a diagrammatic plan view showing the drive for the spools reversed from that shown in FIG. 1.

FIG. 12 is a view in enlarged scale of a stop mechanism taken on line 12—12 of FIG. 2 looking in the direction of the arrows; and FIG. 13 is a sectional view of the stop mechanism taken on line 13—13 of FIG. 12 looking in the direction of the arrows.

Figure 1:
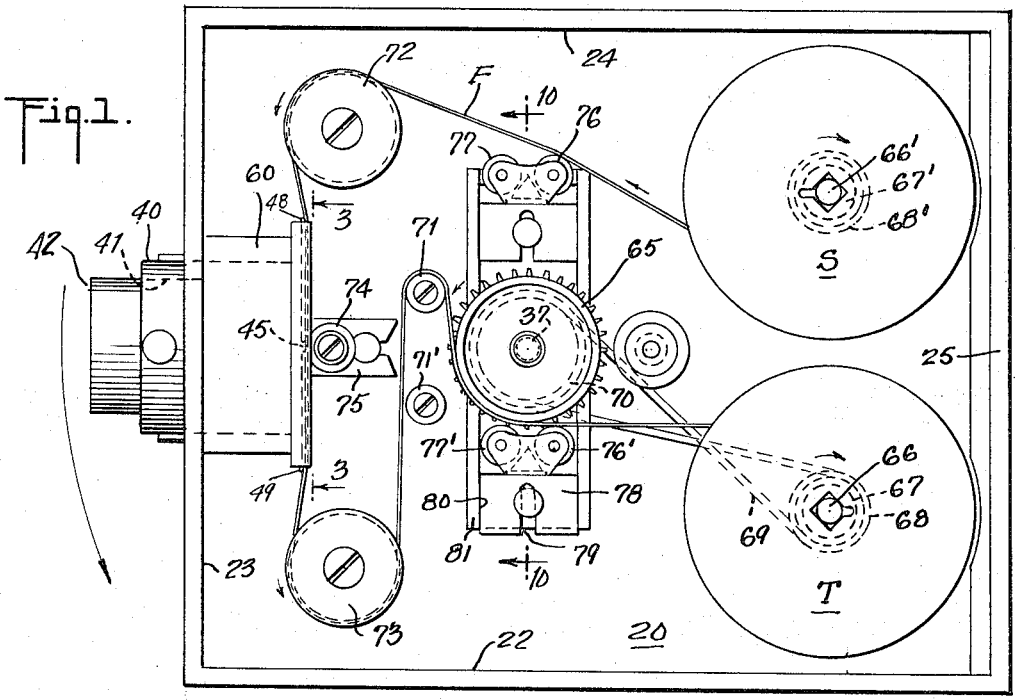
FIG. 1 is a top plan view of the panoramic camera constructed in accordance with the invention.

In the particular embodiment of the invention illustrated in the drawings the camera consists of a housing comprising a bottom 20, top 21 and walls 22, 23, 24 and 25. The camera box is mounted on posts 26 and 27 which in turn are secured and extend upwardly from a disc 28 rotatably mounted on a vertical shaft 29 supported on a block 30. The block 30 has extending outwardly therefrom a supporting plate 31 on which is mounted a motor M. This motor drives a shaft 32 on the upper end of which is mounted a friction driving disc 33 which engages the peripheral edge 34 of the disc 28.

The shaft 29 has mounted thereon a large helical gear 35 which meshes with a smaller helical gear 36 mounted on a vertical shaft 37 which extends upwardly through the bottom 20 into the camera housing. The gear 35 is stationary, gear 36 turning as it travels with the camera.

The front of the camera has secured thereto a block 40 having a cylindrical opening 41 therein which receives a tube 42 in which are attached the desired lenses.

The front wall 23 of the camera housing has formed therein in back of the cylindrical opening 41 a vertical slot 45 which is formed between the inner edges 46 and 47 of a pair of adjustable plates 48 and 49 which are slidably mounted in channels 50 and 51 formed in a plate 52. The plates 48 and 49 can be adjusted toward or away from each other to vary the width of the slot 45 by means of turning a screw 55 which is threaded at 56 and 57 to the plates 48 and 49. The screw 55 is threaded to the plate 49 by a right hand thread and to the plate 48 by a left hand thread. Thus it will be seen that when the screw is turned the plates will be moved away from or toward each other.

The plate 52 is mounted on the back of a chamber 60 which is formed between the tube 42 and the adjustable plates which form the slot 45.

The shaft 37 has mounted on the upper end thereof a sprocket wheel 65 such as that shown in FIGS. 6 and 7. This sprocket wheel pulls a film F which is withdrawn from supply spool S mounted on a spindle 66'. The spindle 66 has secured thereto a hub 67 having mounted a pulley 68 which is driven by a belt 69 mounted on a pulley 70 which in turn is mounted on the shaft 37, and drives take-up spool T.

Figure 2:
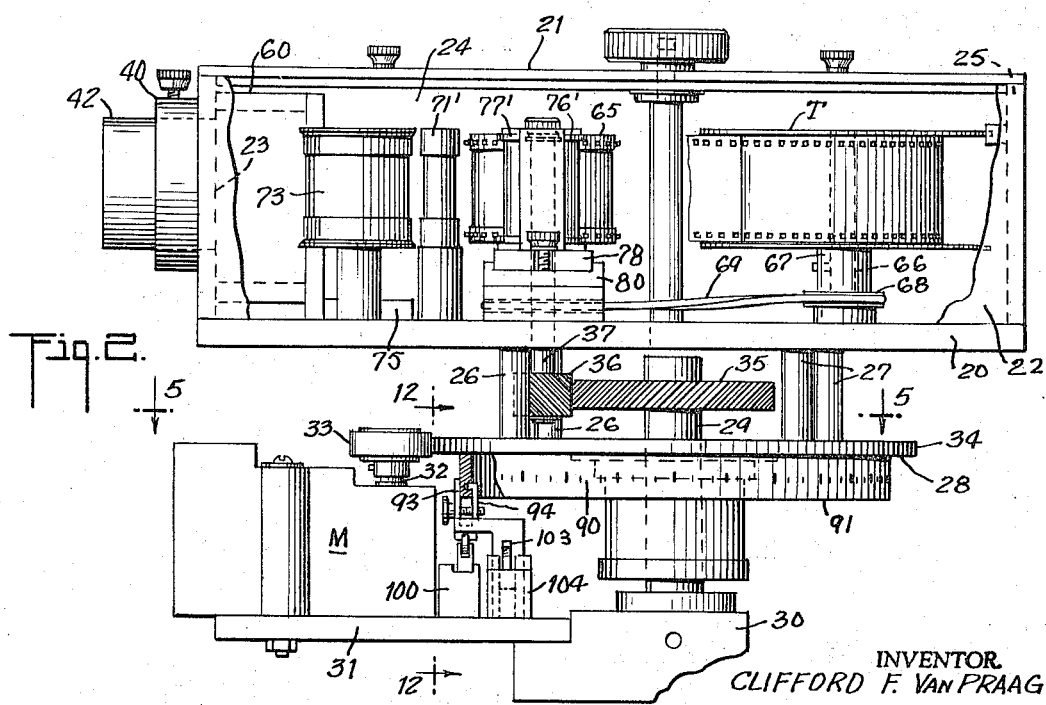
FIG. 2 is a side elevation of the structure shown in FIG. 1 showing the driving connections for the camera and for the film driving sprocket, with film broken away.

The film F pulled by the sprocket 65 is led from supply spool S around an idler 76 and around a spool 72 and thence to a spool 73, the spools 72 and 73 being freely rotatable, thence around idler 71 to sprocket 65 to driven taken-up spool T. It will be noted that the film in passing from spool 72 to the spool 73 passes in back of the exposure slot 45 and is held in position by an idler 74 which is mounted on a plate 75 adjustably mounted on the bottom 20 of the camera housing as shown in FIG. 2.

The film is held against a sprocket 65 by a pair of idlers 76' and 77' mounted on plate 78 which has a slot 79 and is adjustably mounted in a guideway 80 formed in a plate 81.

The idlers 76' and 77' can be moved away from the sprocket 65 to permit threading the film F around the sprocket to hold the film in position. The film as shown particularly in FIG. 3 has two sets of slots 82 and 83 adjacent its edges and the sprocket wheel has two sets of sprocket teeth as shown in FIG. 7.

FIG. 11 illustrates diagrammatically the path of the film around the idlers when the drive is reversed and the supply spool S is placed on spindle 66 and the take-up spool T is placed on spindle 66'. In this case the film is taken from the spool S and passes around the idler 76', around the spool 73 to spool 72, around idler 71' to sprocket 65, being held by idlers 77 and 76 against the sprocket wheel. From the sprocket the film passes to driven take-up spool T mounted now on 66'. In this case the belt drive 69 for the spindle 66' of the spool T is connected to drive the pulley 68'.

In FIGS. 6 and 7 and 8 and 9 are shown sprocket wheels 85, 86 which can be substituted for the sprocket wheel 65 on the shaft 37 for a different speed of lens. Various other sizes of sprockets may be used, as, for instance, an 8-tooth sprocket for a 25 mm. lens, a 12-tooth sprocket for a 38 mm. lens, a 16-tooth sprocket for a 50 mm. lens, a 24-tooth sprocket for a 75 mm. lens, a 32-tooth sprocket for a 100 mm. lens, and so forth.

As the length of film exposed in panoramic cameras during one revolution of the camera is equal to the circumference of a circle having the focal length of the lens as a radius, the sprocket used for driving the lens must be changed as the lens is changed to drive the film at the proper rate of speed.

In order to provide a smoothly operating camera which will drive the film past the exposure slot in a continuous smooth movement, the spools or idlers are mounted on spindles coated with a silicone grease which provides a damping or braking action during the rotation of the spools or idlers, and prevents an uneven or interrupted feed of the film.

In order to determine the amount of rotation of the camera a graduated scale 90 is formed on a ring 91 which is secured and depends from the disc 28. The ring 91 has an annular groove 92 in the back thereof and an adjustable stop member 93 extends beneath the bottom of the ring 91 and upwardly on the back as shown at 94 and has formed on the end thereof a projection 95 which extends into the groove 92. A thumbscrew 96 tightens the member 93 on the ring 91. The stop member projects upwardly as shown at 97 and can be moved around the ring to a position opposite any desired degree graduation. These graduations extend from zero to 360°.

If it is desired to stop the rotation of the camera under 360° the member 93 is clamped to the ring opposite the desired degree mark. The member 93 extends downwardly as shown at 98 and the extension 98 is adapted to engage and trip an arm 99 on a microswitch 100 which is connected to the motor circuit of the motor M. When the switch is tripped the motor circuit is opened and the drive is discontinued. A positive stop member 101 is slidably mounted in a base 102 and is spring biased to engage adjustable stop 93 as microswitch 100 is opened. To start motor, lever 103 is depressed and closes microswitch 104 through surface 105 and contact 106. Switch 104 starts motor M and allows switch 100 to take over when stop 93 clears lever 99. Spring 105 returns stop 101 to stop position when released.

Although one specific embodiment of the invention has been particularly shown and described, it will be understood that the invention is capable of modification and that changes in the construction and in the arrangement of the various cooperating parts may be made without departing from the spirit or scope of the invention as expressed in the following claims.

I claim:
1. A panoramic camera comprising a housing, said housing having a slot in one wall, a film supply spool, a film take-up spool, means for guiding the film from the supply spool to the take-up spool in a path in back of said slot, means for rotating the housing, means for feeding the film in synchronism with the rotational speed of the housing, means for rotating the take-up spool in synchronism with the rotation of the housing, and means for pre-setting the camera for discontinuing the rotation of the camera housing at any desired angle of rotation, wherein said latter means includes a first means for initially discontinuing a driving of said housing and a second means for subsequently and separately positively stopping said housing after discontinuing of the driving, and wherein said housing is mounted on a base and an actuating means is adjustably mounted on said base, said actuating means contacting and controlling the operation of said first and second means.

2. The camera of claim 1 wherein said means for feeding comprise sprocket means selectively replaceable depending upon the lens utilized.

3. A panoramic camera comprising a housing, said housing having a slot in one wall, a film supply spool, a film take-up spool, means for guiding the film from the supply spool to the take-up spool in a path in back of said slot, means for rotating the housing, means for feeding the film in synchronism with the rotational speed of the housing, means for rotating the take-up spool in synchronism with the rotation of the housing, and means for pre-setting the camera for discontinuing the rotation of the camera housing at any desired angle of rotation, said latter means including a first means for discontinuing a driving of said housing and a second means for positively stopping said housing, said housing being mounted on a base and an actuating means being adjustably mounted on said base, said actuating means contacting and controlling the operation of said first and second means, and said first means comprising a first switch connected to a motor which drives said housing, said first switch being adapted to open a circuit to the motor, a second switch being provided, operable by said said second means upon releasing contact between said actuating means and said second means, for closing a circuit to the driving motor and re-initiating rotation of said housing until said actuating means mounted on said housing base releases contact with said first switch.

References Cited

UNITED STATES PATENTS

| | | | |
|---|---|---|---|
| 369,165 | 8/1887 | Connon | 95—15 |
| 780,406 | 1/1905 | Brehm | 95—15 |
| 792,423 | 6/1905 | Kiessig | 95—15 |
| 893,819 | 7/1908 | Stewart | 95—15 |
| 1,751,774 | 3/1930 | Trullinger | 95—15 X |
| 2,068,410 | 1/1937 | Hanke | 95—15 X |
| 2,099,681 | 11/1937 | Braeger | 95—31 |
| 3,142,237 | 7/1964 | Waroux | 95—15 |
| 3,183,810 | 5/1965 | Campbell | 95—15 X |

JOHN M. HORAN, *Primary Examiner.*